(No Model.)
J. S. WOOD.
DISINFECTING APPARATUS.
No. 287,208. Patented Oct. 23, 1883.
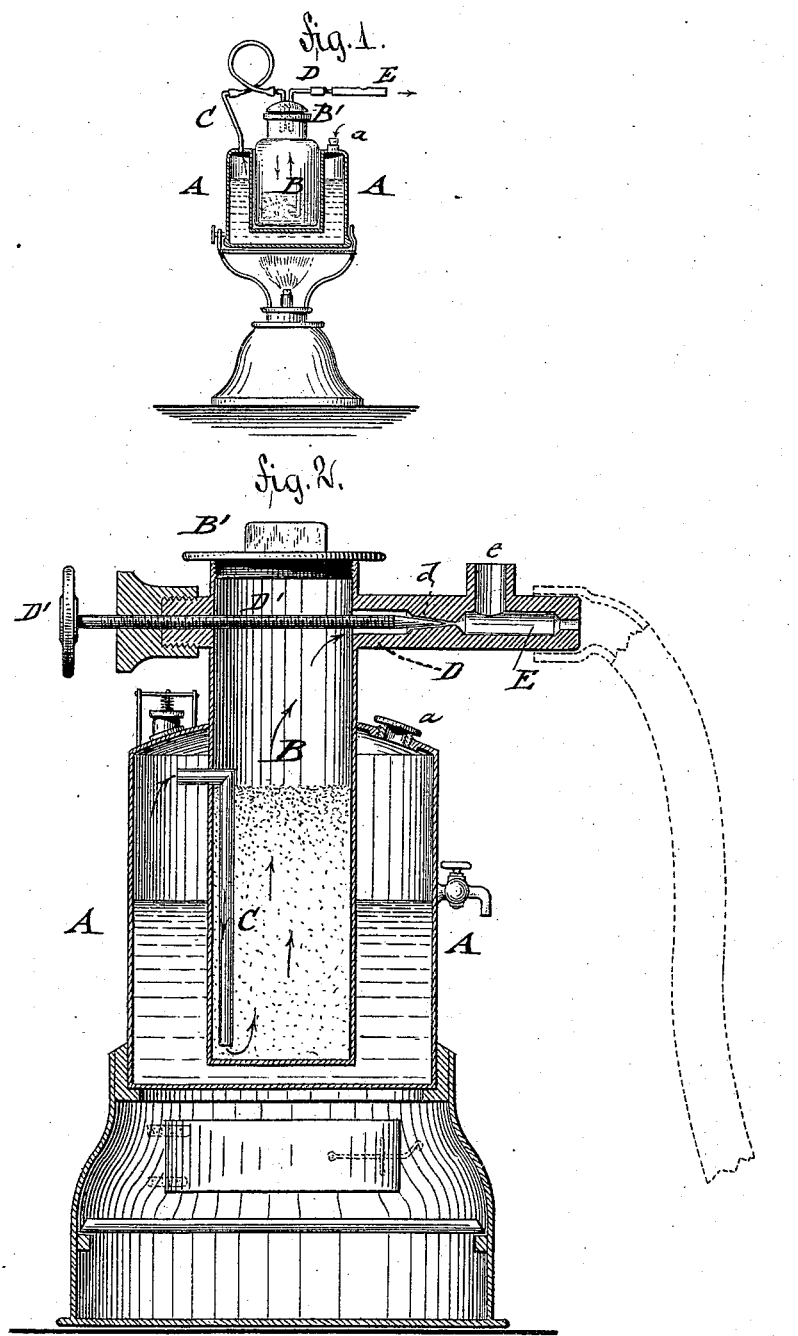

UNITED STATES PATENT OFFICE.

JOSEPH S. WOOD, OF BROOKLYN, NEW YORK.

DISINFECTING APPARATUS.

SPECIFICATION forming part of Letters Patent No. 287,208, dated October 23, 1883.

Application filed August 30, 1883. (No model.)

*To all whom it may concern:*

Be it known that I, JOSEPH S. WOOD, a citizen of the United States, and resident of Brooklyn, in the county of Kings and State of New York, have invented certain new and useful Improvements in Inhaling and Disinfecting Apparatus, of which the following is a specification.

This invention has reference to an improved inhaling and disinfecting apparatus of a simple and very effective construction, in which the chemical or medicinal substances are vaporized by heat ejected by steam-pressure and mixed with atmospheric air; and the invention consists of an exterior vessel or tank that is adapted to be heated, a hermetically-closed interior vessel charged with the chemical, medicinal, or other substances to be vaporized, a pipe which conducts the steam generated in the exterior vessel or tank into the hermetically-closed vessel, and means whereby the steam and vapors in the vessel are conducted off and mixed with atmospheric air.

In the accompanying drawings, Figure 1 represents a vertical central section of an inhaling apparatus constructed according to my improvement. Fig. 2 is a vertical central section of a disinfecting apparatus, and Fig. 3 is a detail of the top part of the interior vaporizing-vessel with its steam supply and discharge pipes.

Similar letters of reference indicate corresponding parts.

A in the drawings represents an exterior closed vessel or tank, of cylindrical or other shape, which is partly filled with water through a top opening, that is then closed by a tightly-fitting screw-plug, $a$. The tank A is adapted to be heated by a coal fire, gas, petroleum, or alcohol flame, or other source of heat. In the tank A is arranged an interior vessel, B, which is hermetically closed by a removable stopper or lid, B'. The vessel B is filled with the chemical or medicinal substances to be evaporated. The tank A is connected with the vessel B by a steam-pipe, C, that connects the upper part of the tank with the interior of the vessel B, so that the steam generated in the tank is conducted to the interior of the vessel B. A second pipe, D, leads from the vessel B to the outside, and is provided with a tapering nozzle, $d$, that discharges the steam which is impregnated with the vaporized contents in the vessel B to a mixing-chamber, E, formed around the nozzle $d$, said mixing-chamber being provided with an air-port, $e$, through which atmospheric air is drawn in and mixed with the vapors.

To the mixing-chamber E is connected a flexible or other pipe, having a mouth-piece that is applied in the case of an inhaler to the mouth, ear, or nose, while for disinfecting purposes a rubber hose of suitable length is used that is provided with a spray-nozzle for the proper distribution of the vapors.

The tank A, as well as the vessel B, may be provided with safety-valves to prevent the danger of explosion. In large apparatus the discharge-nozzle of the pipe D is provided with an adjustable needle-valve, D', by which the discharge of vapors may be regulated.

When the apparatus is to be used, the water in the tank is first heated to the boiling-point, whereby also the contents of the vessel B are heated up. The steam generated in the tanks passes through pipe C into the vessel B, where it mingles with the vapors of the chemical or medicinal substances contained therein. The steam and vapors are next forced through the discharge-nozzle $d$ into the mixing-chamber E, where the vapors are mixed with atmospheric air, which forms jointly with the steam the carrier for the vapors, so as to conduct them to the place of use. As the steam condenses in part a moist mixture of steam, medicinal vapors, and atmospheric air is formed, that is very effective for inhaling or disinfecting purposes, as the case may be.

When the apparatus is made on a smaller scale, it forms a cheap and compact inhaler, to be used in place of the more expensive inhalers that are based on the atomizing principle. When constructed on a larger scale, a powerful disinfecting apparatus for hospitals, vessels, and for use in the arts is obtained.

Having thus described my invention, I claim as new and desire to secure by Letters Patent—

An inhaling and disinfecting apparatus composed of an exterior vessel or tank, an interior hermetically-closed vessel containing the chemical or medicinal substances to be evaporated, a pipe by which the tank is connected with the interior vessel, a discharge-pipe having an ejection-nozzle, and a mixing-chamber having an air-port, substantially as and for the purpose set forth.

In testimony that I claim the foregoing as my invention I have signed my name in presence of two subscribing witnesses.

JOSEPH S. WOOD.

Witnesses:
CARL KARP,
SIDNEY MANN.